(12) United States Patent
Kuntze et al.

(10) Patent No.: US 7,673,892 B2
(45) Date of Patent: Mar. 9, 2010

(54) THIXOMOLD HINGE ASSEMBLY

(75) Inventors: Christopher John Kuntze, Clarkston, MI (US); Steve Giles, Troy, MI (US); Daniel V. Beckley, Byron, MI (US); Jason Fulcher, Royal Oak, MI (US); Ben Reginella, Bradford (CA); Timothy F. O'Brien, White Lake, MI (US)

(73) Assignee: Magna International Inc., Aurora, Ontario (CA)

( * ) Notice: Subject to any disclaimer, the term of this patent is extended or adjusted under 35 U.S.C. 154(b) by 228 days.

(21) Appl. No.: 11/743,174

(22) Filed: May 2, 2007

(65) Prior Publication Data

US 2008/0271936 A1 Nov. 6, 2008

(51) Int. Cl.
*B60R 3/00* (2006.01)
(52) U.S. Cl. .............. 280/163; 280/166; 280/164.2
(58) Field of Classification Search ............ 280/166, 280/163, 169, 727, 164.1, 164.2; 16/54, 16/92, 221, 227, 230, 231, 302
See application file for complete search history.

(56) References Cited

U.S. PATENT DOCUMENTS

| | | | | |
|---|---|---|---|---|
| 5,842,709 | A * | 12/1998 | Maccabee | 280/166 |
| 6,942,233 | B2 * | 9/2005 | Leitner et al. | 280/166 |
| 7,055,839 | B2 * | 6/2006 | Leitner | 280/166 |
| 7,118,120 | B2 * | 10/2006 | Lee et al. | 280/166 |
| 7,278,771 | B2 * | 10/2007 | Campbell | 359/837 |
| 7,377,531 | B2 * | 5/2008 | Fabiano et al. | 280/163 |
| 7,380,807 | B2 * | 6/2008 | Leitner | 280/166 |
| 7,487,986 | B2 * | 2/2009 | Leitner et al. | 280/166 |
| 2008/0116653 | A1 * | 5/2008 | Piotrowski | 280/166 |

* cited by examiner

*Primary Examiner*—Hau V Phan
(74) *Attorney, Agent, or Firm*—Clark Hill, PLC

(57) ABSTRACT

A hinge assembly is provided for moving a step on a motor vehicle between a stowed position and a deployed position. A rail bracket is fixedly secured to the vehicle and includes inner and outer bushings insert molded therein. A step bracket includes inner and outer bushings insert molded therein. The step is fixedly secured to the step bracket. An inner arm includes upper and lower pivot shafts insert molded therein. The upper and lower pivot shafts protrude from the inner arm and are pivotally disposed in the inner bushings of the rail and step brackets, respectively. An outer arm includes upper and lower pivot shafts insert molded therein. The upper and lower pivot shafts protrude from the outer arm and are pivotally disposed in the outer bushings of the rail and step brackets, respectively.

5 Claims, 12 Drawing Sheets

THIXOMOLD HINGE ASSEMBLY

BACKGROUND OF THE INVENTION

1. Field of the Invention

The invention relates to a thixomold hinge assembly. More particularly, this invention relates to a thixomold hinge assembly including hinge components such as bearings and pivot shafts insert molded therein.

2. Description of the Related Art

It is well-known in the art to provide retractable running boards or step assemblies along one side of a motor vehicle to assist a passenger in either entering and exiting or accessing a motor vehicle having a high ground clearance. These so-called retractable running boards are generally movable between a retracted or stowed position, in which a step is tucked underneath an underbody of the motor vehicle, and an extended or deployed position, in which the step is spaced apart from the underbody of the motor vehicle to support the passenger as they enter or exit the motor vehicle.

Retractable running boards commonly include one or more hinge assemblies that incorporate a four-bar linkage for securing the step to the motor vehicle. The four-bar linkage includes four distinct members or links and actuates to move the step between the stowed and deployed positions. Generally, the links are individually stamped from Steel or die cast from Aluminum which requires that the links undergo secondary machining operations in order to produce a finished part that meets specific dimensional tolerances. The links are then assembled using additional components such as pins, bolts, bearings and the like.

Although the prior art designs of hinge assemblies perform adequately in most situations, with increasing fuel economy standards there exists a need to reduce the weight of motor vehicle components. In addition, automotive companies are always on the look-out for opportunities to reduce labor costs associated with secondary manufacturing operations and part assembly. It is therefore desirable to provide a hinge assembly that weighs less than a typical Steel or Aluminum hinge assembly, eliminates secondary machining operations, and reduces assembly labor costs.

SUMMARY OF THE INVENTION

According to one aspect of the invention, a hinge assembly is provided for moving a step between a stowed position generally adjacent a motor vehicle and a deployed position spaced apart from the motor vehicle. The hinge assembly includes a rail bracket that is adapted to be fixedly secured to the motor vehicle. The rail bracket includes inner and outer bushings that are insert molded therein. The hinge assembly also includes a step bracket having inner and outer bushings that are insert molded therein. The step is fixedly secured to the step bracket. The hinge assembly further includes an inner arm having upper and lower pivot shafts that are insert molded therein and protrude therefrom. The upper pivot shaft is pivotally disposed in the inner bushing of the rail bracket and the lower pivot shaft is pivotally disposed in the inner bushing of the step bracket. The hinge assembly further includes an outer arm having upper and lower pivot shafts that are insert molded therein and protrude therefrom. The upper pivot shaft is pivotally disposed in the outer bushing of the rail bracket and the lower pivot shaft is pivotally disposed in the outer bushing of the step bracket.

According to another aspect of the invention, a hinge assembly is provided for moving a step between a stowed position generally adjacent a motor vehicle and a deployed position spaced apart from the motor vehicle. The hinge assembly includes a rail bracket that is adapted to be fixedly secured to the motor vehicle. The rail bracket includes inner and outer pivot shafts that are insert molded therein and protrude therefrom. The hinge assembly also includes a step bracket having inner and outer pivot shafts that are insert molded therein and protrude therefrom. The step is fixedly secured to the step bracket. The hinge assembly further includes an inner arm that extends between upper and lower ends each having a bushing that is insert molded therein. The inner pivot shafts of the rail and step brackets are pivotally disposed in the bushings at the upper and lower ends of the inner arm, respectively. The hinge assembly further includes an outer arm that extends between upper and lower ends each having a bushing that is insert molded therein. The outer pivot shafts of the rail and step brackets are pivotally disposed in the bushings at the upper and lower ends of the outer arm, respectively.

According to another aspect of the invention, a method of manufacturing a hinge assembly including a rail bracket having first and second portions each with inner and outer bushings, a step bracket having first and second parts each with inner and outer bushings, an inner arm having upper and lower pivot shafts, and an outer arm having upper and lower pivot shafts utilizes a THIXOMOLDING™ process including a die. The method of manufacturing the hinge assembly includes the steps of: locating a plurality of the inner and outer bushings in the die; locating a plurality of the upper and lower pivot shafts in the die; molding the first and second portions of the rail bracket with the inner and outer bushings insert molded therein, the first and second parts of the step bracket with the inner and outer bushings insert molded therein, the inner arm with the upper and lower pivot shafts insert molded therein, and the outer arm with the upper and lower pivot shafts insert molded therein in the die; removing the first and second portions of the rail bracket, the first and second parts of the step bracket, and the inner and outer arms from the die; and assembling the first and second portions of the rail bracket, the first and second parts of the step bracket, and the inner and outer arms to form the hinge assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
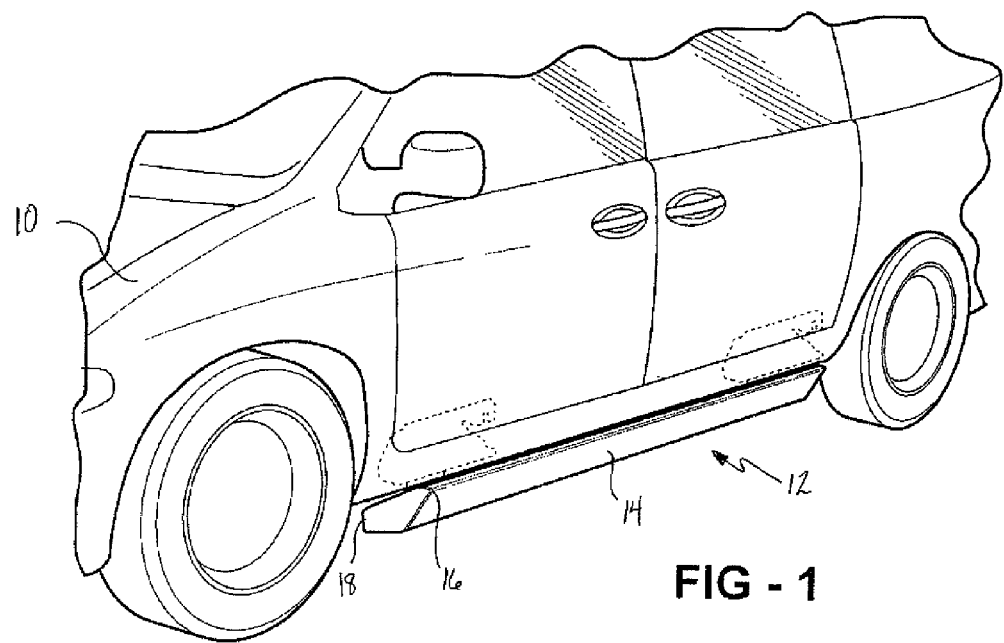
FIG. 1 is a side perspective view of a motor vehicle including a step assembly according to the invention mounted to an underbody and having a step in a stowed position.
Figure 2:
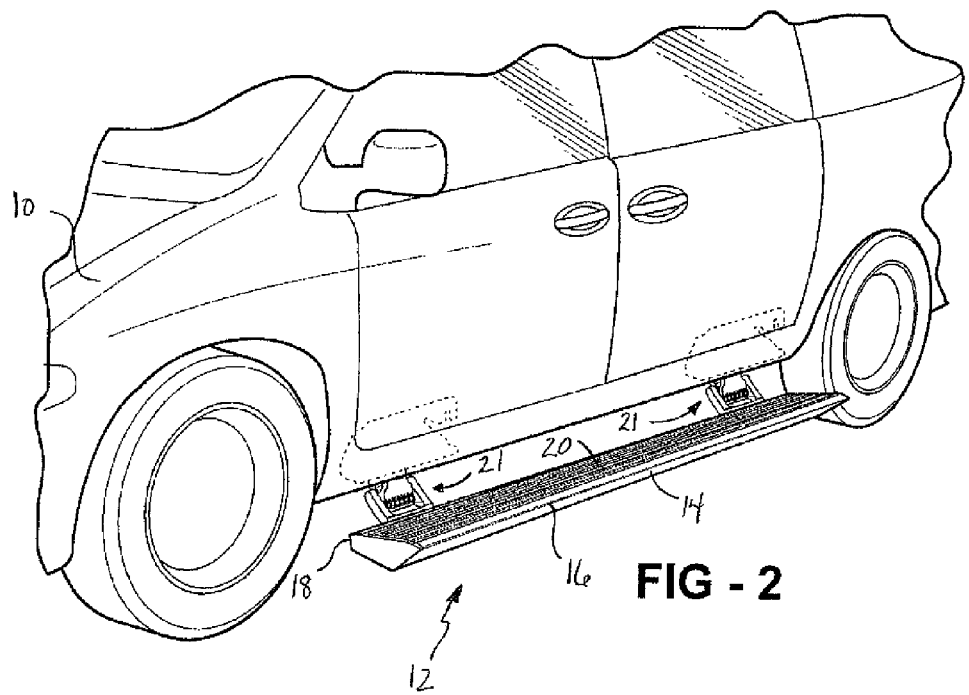
FIG. 2 is a side perspective view of the motor vehicle including the step in a deployed position.
Figure 3:
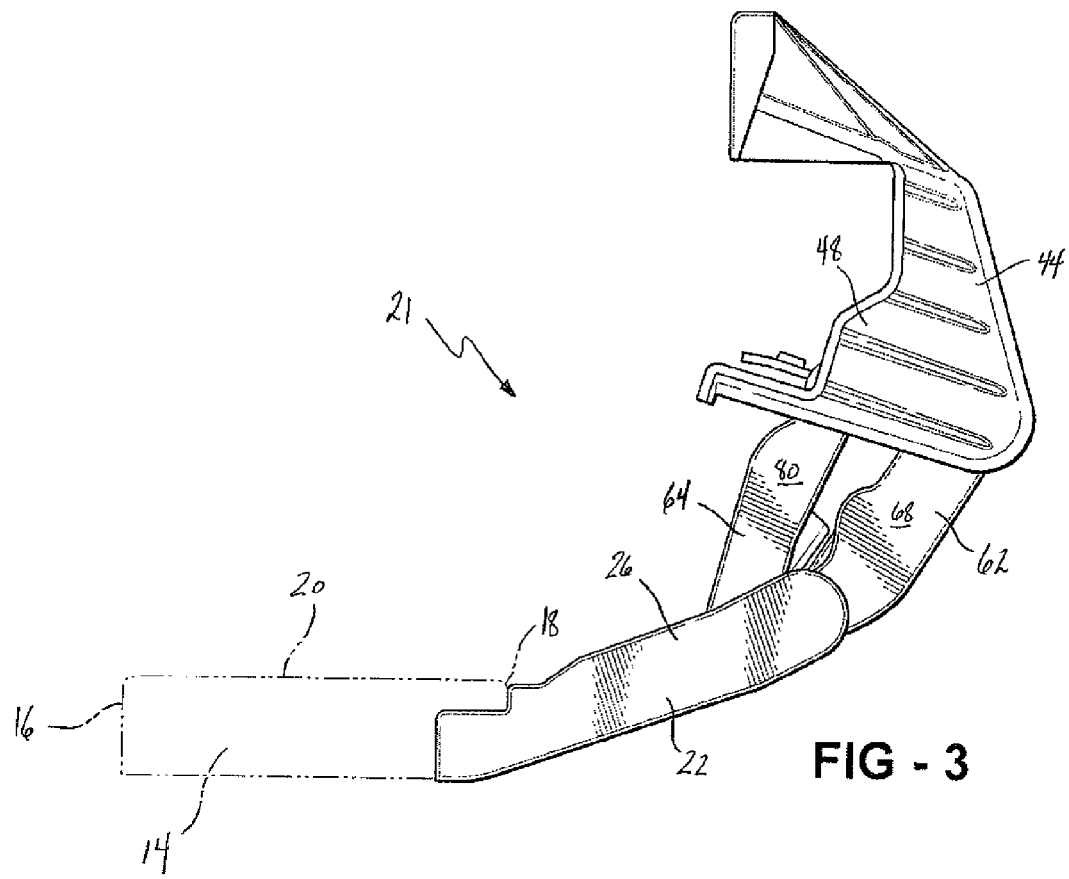
FIG. 3 is a side view of the step assembly in the deployed position including a Thixomold hinge assembly.
Figure 4:
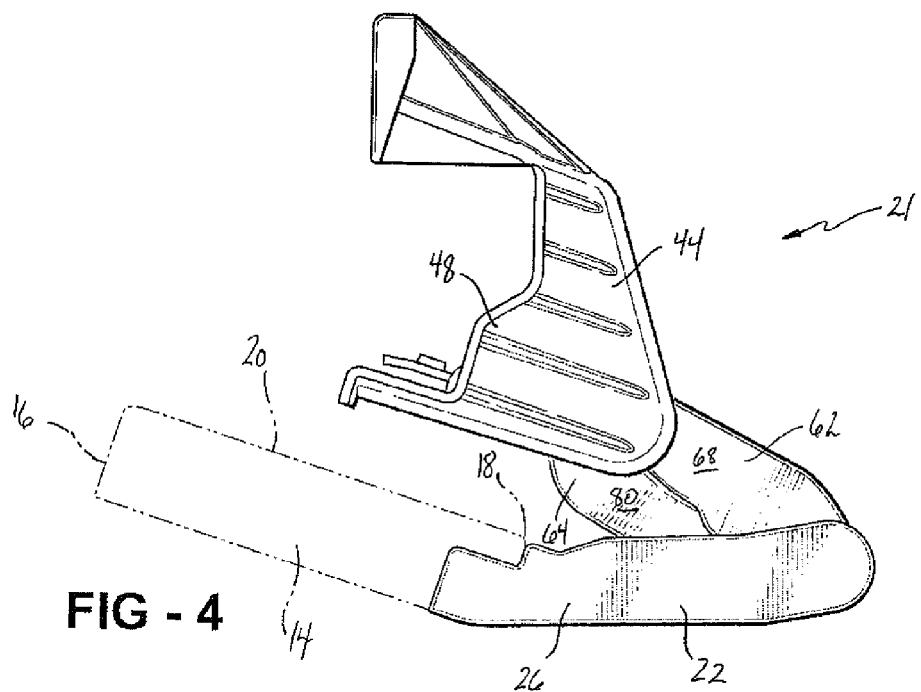
FIG. 4 is a side view of the step assembly in the stowed position including the Thixomold hinge assembly.
Figure 5:
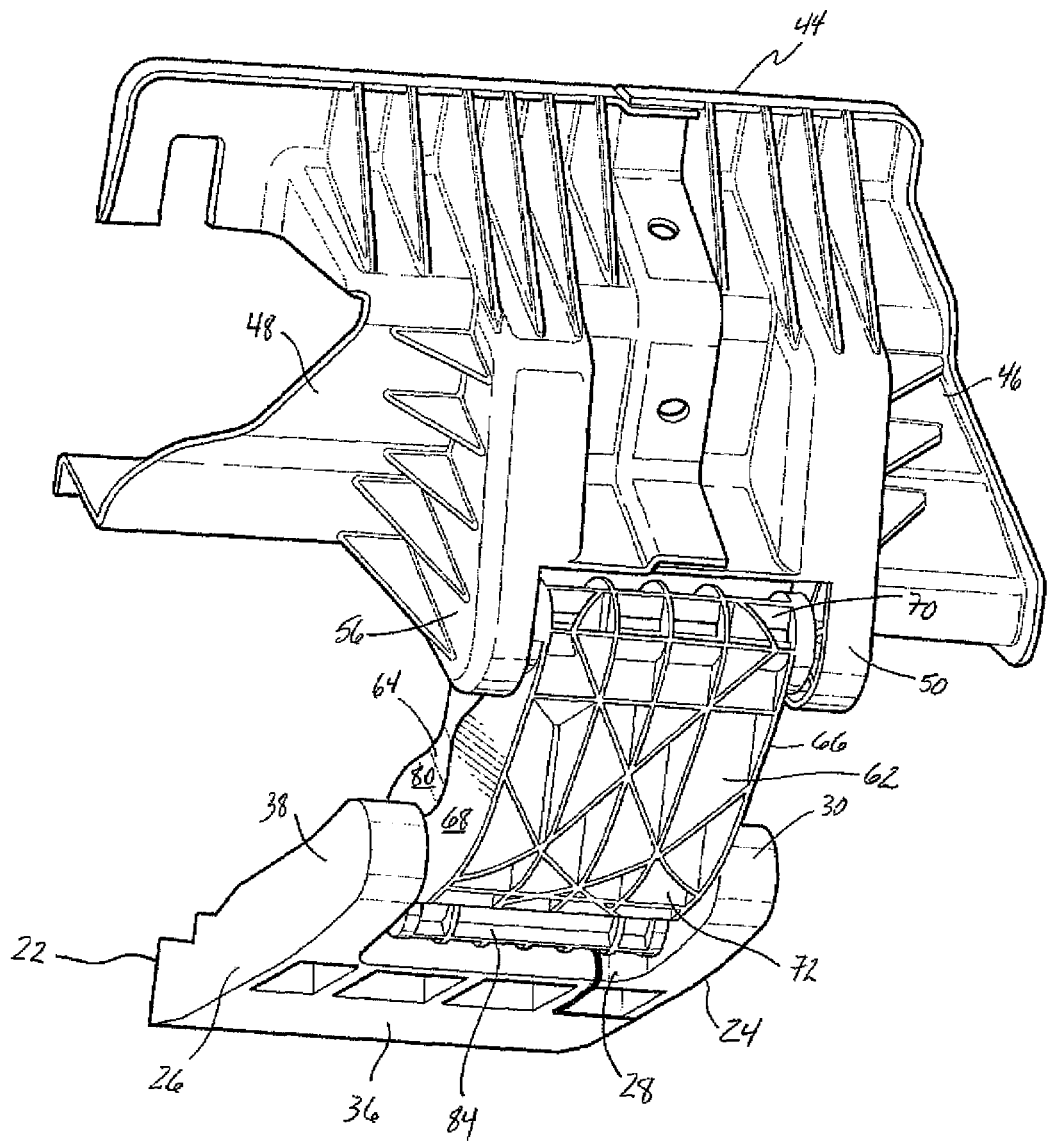
FIG. 5 is an inside perspective view of the Thixomold hinge assembly.
Figure 6:
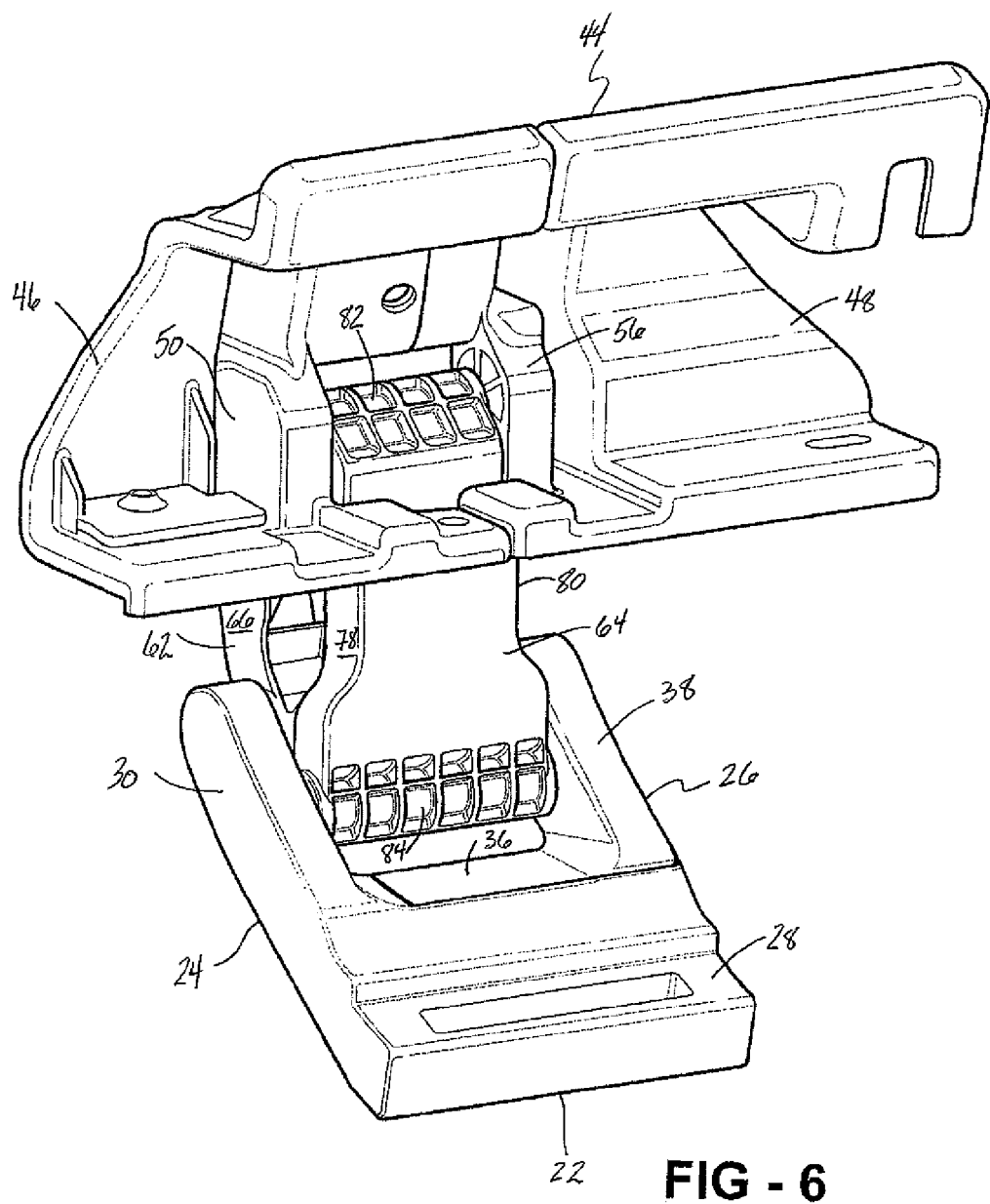
FIG. 6 is an outside perspective view of the Thixomold hinge assembly.

Referring to FIGS. 1 and 2, a motor vehicle 10 is shown. A retractable step assembly, generally shown at 12, is associated with the motor vehicle 10 and extends along a lower portion of one side thereof. The retractable step assembly 12 includes a step 14 having an outboard side 16 and an opposing inboard side 18. The step 14 includes a stepping surface 20 extending between the outboard 16 and inboard 18 sides. The step 14 is movable between a stowed or retracted position, shown in FIG. 1, and a deployed or extended position, shown in FIG. 2. The retractable step assembly 12 includes a pair of hinge assemblies, generally shown at 21, for moving the step 14 between the stowed and deployed positions. The inboard side 18 of the step 14 is fixedly secured to a step bracket 22, as shown in FIGS. 3 and 4.

Figure 7:
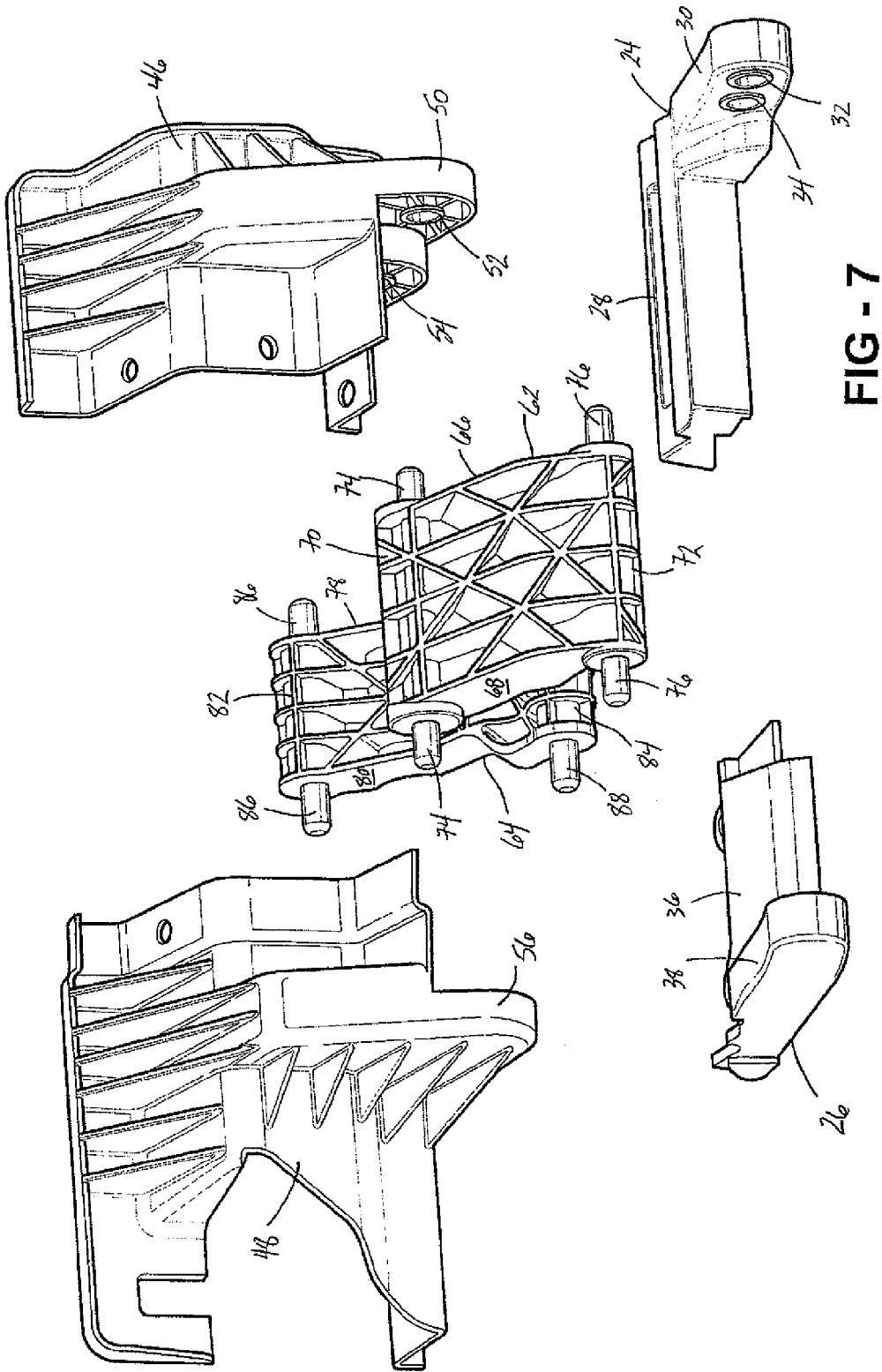
FIG. 7 is an exploded, inside perspective view of the Thixomold hinge assembly.
Figure 9:
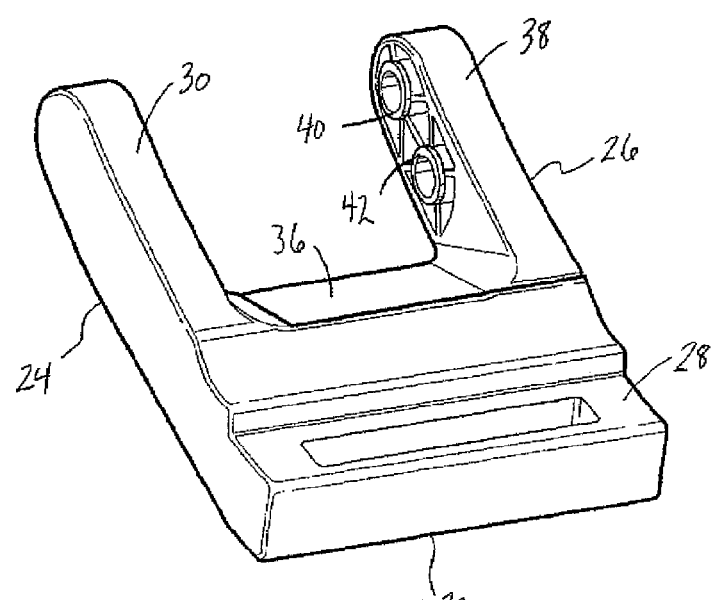
FIG. 9 is an outside perspective view of a step bracket of the Thixomold hinge assembly.
Figure 10:
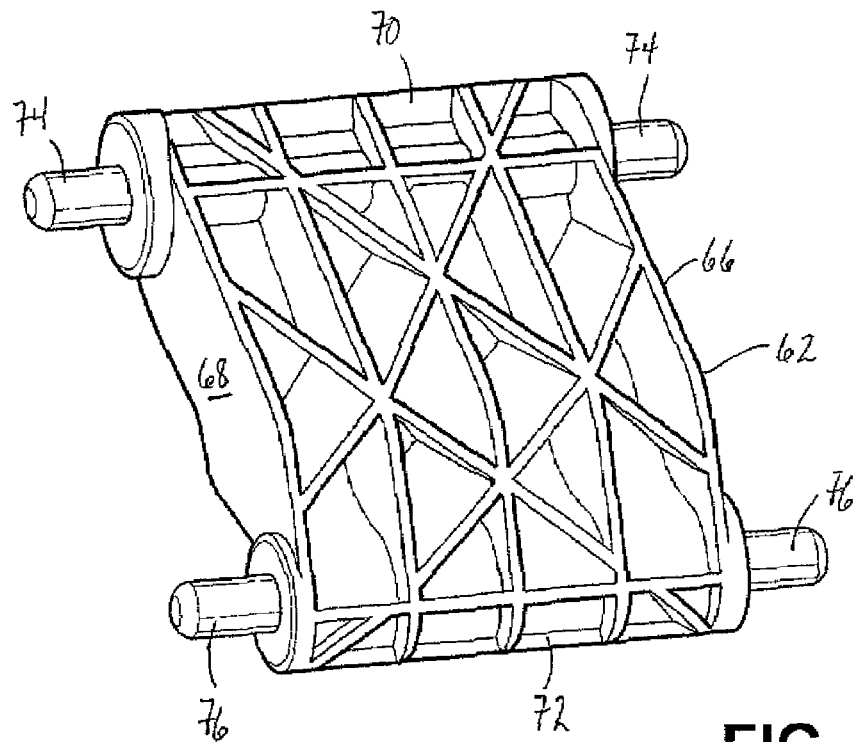
FIG. 10 is an inside perspective view of an inner arm of the Thixomold hinge assembly.
Figure 11:
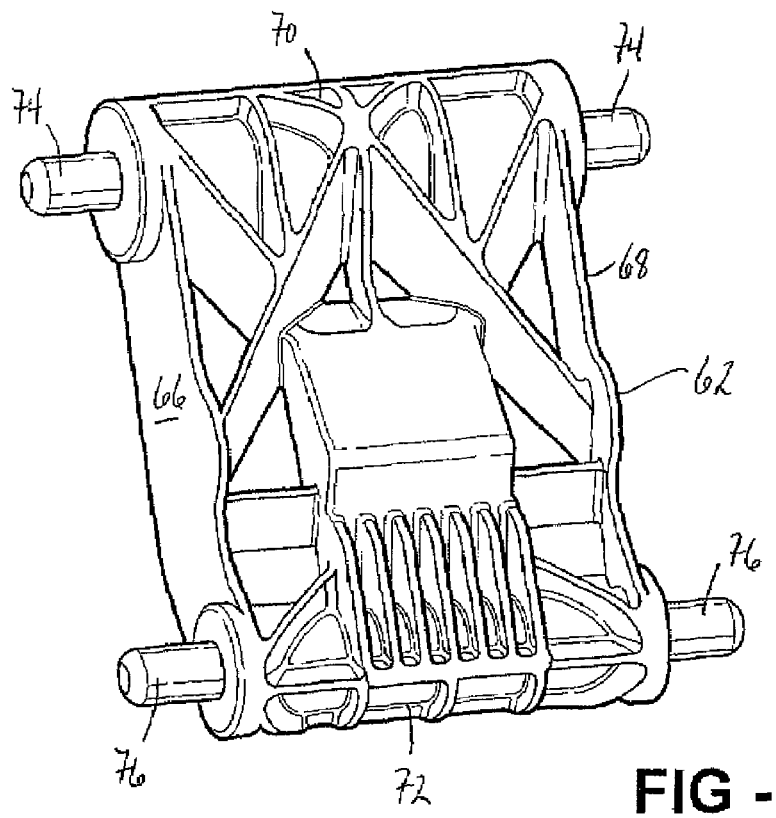
FIG. 11 is an outside perspective view of the inner arm.
Figure 12:
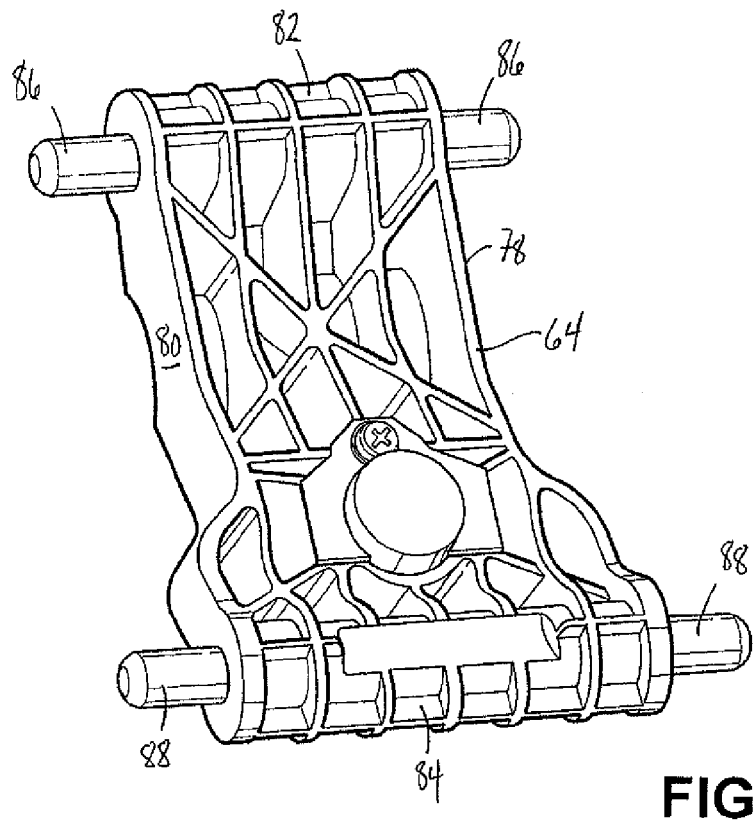
FIG. 12 is an inside perspective view of an outer arm of the Thixomold hinge assembly.
Figure 13:
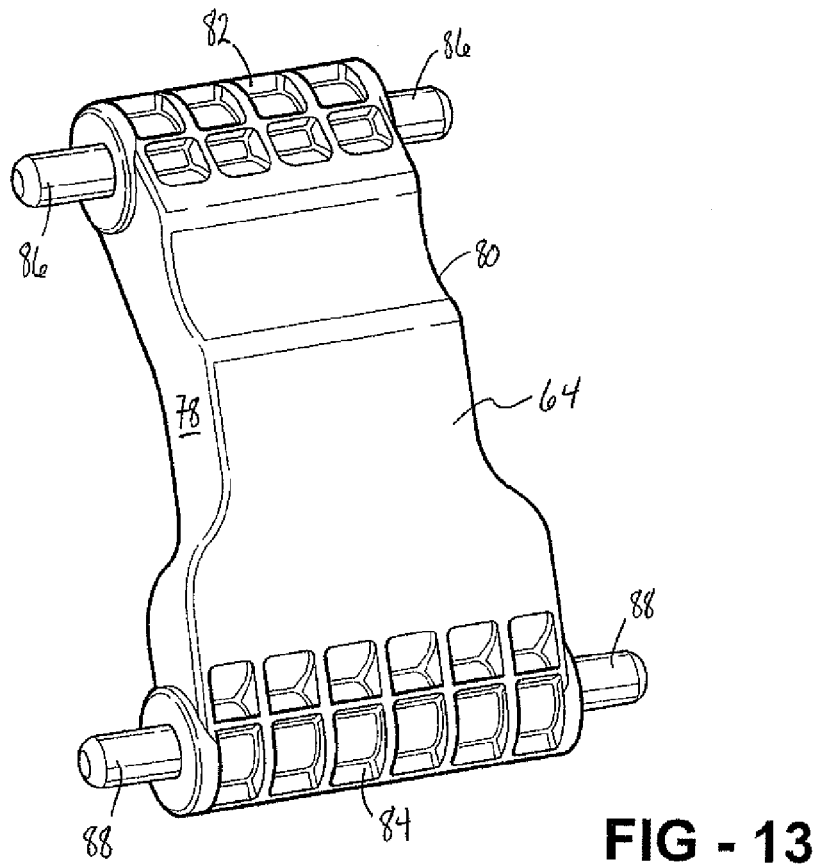
FIG. 13 is an outside perspective view of the outer arm.

Referring to FIGS. 5 through 7, and 9, the step bracket 22 is a two-part bracket, including a first part 24 and a second part 26. In the embodiment shown, the first part 24 includes a body 28 and an arm 30 extending therefrom. The arm 30 includes an inner bearing or bushing 32 and an outer bearing or bushing 34 disposed therein, as shown in FIG. 7. Similarly, the second part 26 includes a body 36 and an arm 38 extending therefrom. The arm 38 includes an inner bearing or bushing 40 and an outer bearing or bushing 42 disposed therein, as shown in FIG. 9. The body 36 of the second part 26 is adapted to fit together with the body 28 of the first part 24. The first 24 and second 26 parts are coupled together by screws or other similar fasteners (not shown) which extend through the body 28, 36 of the respective first 24 and second 26 parts into the step 14, fixedly securing the step 14 to the step bracket 22. When the first 24 and second 26 parts are coupled together, the respective arms 30, 38 are spaced apart and parallel such that the inner 32 and outer 34 bushings of the first part 24 are opposing the inner 40 and outer 42 bushings of the second part 26. The inner 32, 40 and outer 34, 42 bushings are inserts placed in a die or mold (not shown) prior to molding the respective first 24 and second 26 parts using a THIXOMOLDING™ process as is disclosed in U.S. Pat. Nos. 5,878, 804; 5,836,372; 5,819,839; 5,711,366; and 4,964,455, and are hereby incorporated herein by reference. The THIXO-MOLDING™ process is described in more detail below.

Figure 8:
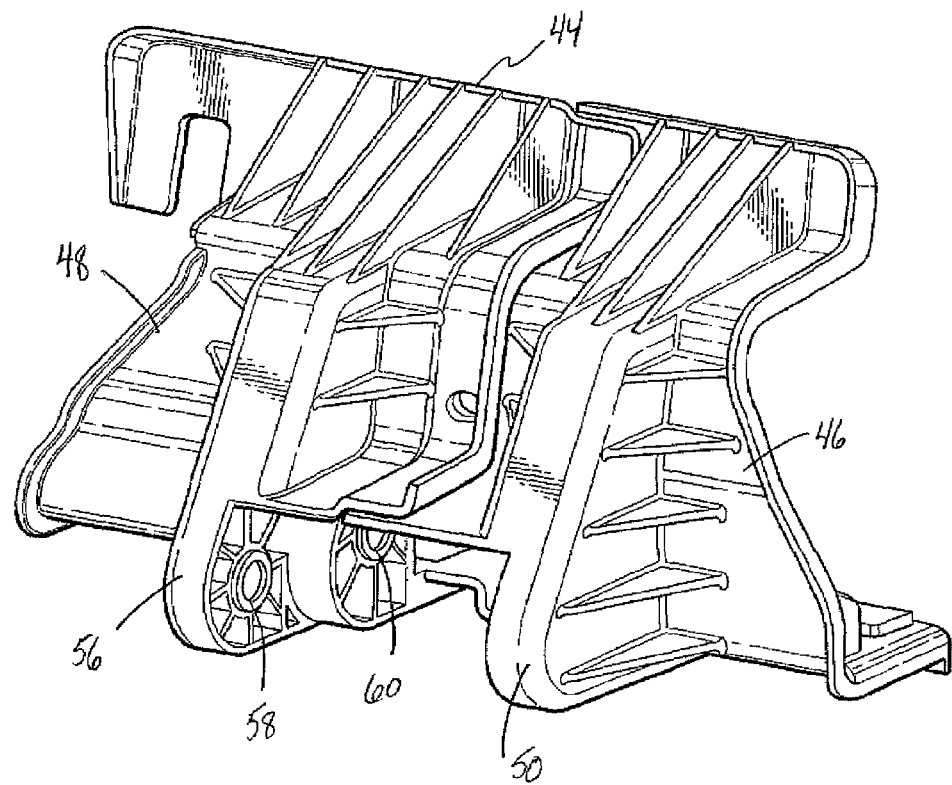
FIG. 8 is an inside perspective view of a rail bracket of the Thixomold hinge assembly.

Referring to FIGS. 5 through 8, a rail bracket 44 is adapted to be fixedly secured to an underbody of the motor vehicle 10. Similar to the step bracket 22, the rail bracket 44 is a two-part bracket, including a first portion 46 and a second portion 48. The first portion 46 includes a support 50 having an inner bearing or bushing 52 and an outer bearing or bushing 54 disposed therein, as shown in FIG. 7. The second portion 48 also includes a support 56 having an inner bearing or bushing 58 and an outer bearing or bushing 60 disposed therein, as shown in FIG. 8. The second portion 48 is adapted to fit together with the first portion 46 and the first 46 and second 48 portions are fixedly secured together using screws or other similar fasteners (not shown). When the second portion 48 is fixedly secured to the first portion 46, the respective supports 50, 56 are spaced apart and parallel such that the inner 52 and outer 54 bushings of the first portion 46 are opposing the inner 58 and outer 60 bushings of the second portion 48. The inner 52, 58 and outer 54, 60 bushings are inserts placed in the die prior to molding the respective first 46 and second 48 portions using the THIXOMOLDING™ process.

Referring to FIGS. 5 through 7 and 10 through 13, each hinge assembly 21 further includes first 62 and second 64 arms each pivotally extending between the rail bracket 44 and the step bracket 22. The first or inner arm 62 includes opposing first 66 and second 68 sides and extends between an upper end 70 and a lower end 72. The upper end 70 includes a pivot shaft 74 which extends laterally through the inner arm 62 and protrudes from both of the first 66 and second 68 sides. The pivot shaft 74 is pivotally disposed in the opposing inner bushings 52, 58 of the rail bracket 44. The lower end 72 also includes a pivot shaft 76 which extends laterally through the inner arm 62 and protrudes from both of the first 66 and second 68 sides. The pivot shaft 76 is pivotally disposed in the opposing inner bushings 32, 40 of the step bracket 22. The pivot shafts 74, 76 are inserts placed in the die prior to molding the inner arm 62 using the THIXOMOLDING™ process.

The second or outer arm 64 includes opposing first 78 and second 80 sides and extends between an upper end 82 and a lower end 84. The upper end 82 includes a pivot shaft 86 which extends laterally through the outer arm 64 and protrudes from both of the first 78 and second 80 sides. The pivot shaft 86 is pivotally disposed in the opposing outer bushings 54, 60 of the rail bracket 44. The lower end 84 also includes a pivot shaft 88 which extends laterally through the outer arm 64 and protrudes from both of the first 78 and second 80 sides. The pivot shaft 88 is pivotally disposed in the opposing bushings 34, 42 of the step bracket 22. The pivot shafts 86, 88 are inserts placed in the die prior to molding the outer arm 64 using the THIXOMOLDING™ process. Pivotal movement of the inner 62 and outer 64 arms relative to the rail bracket 44 and the step bracket 22 moves the step 14 between the stowed position, as shown in FIG. 1, and the deployed position, as shown in FIG. 2.

Figure 14:
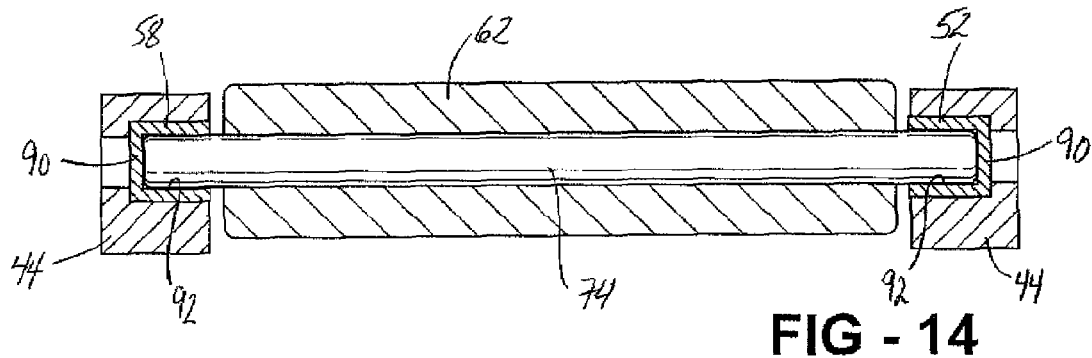
FIG. 14 is a cross-sectional side view illustrating a first pivotal connection.
Figure 15:
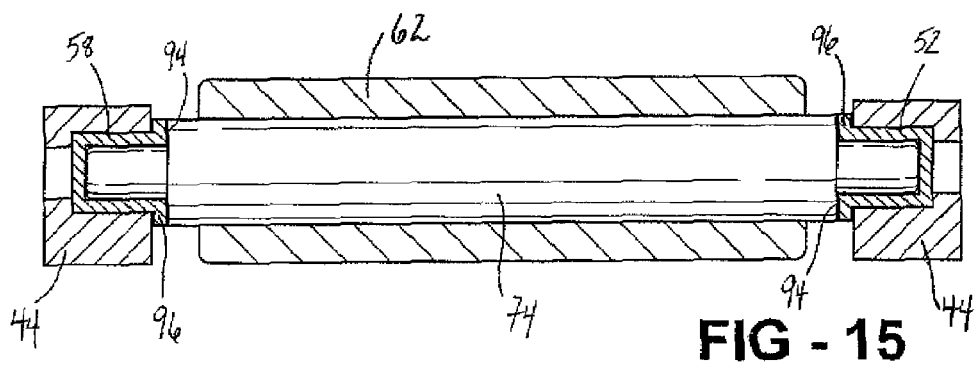
FIG. 15 is a cross-sectional side view illustrating a second pivotal connection.
Figure 16:
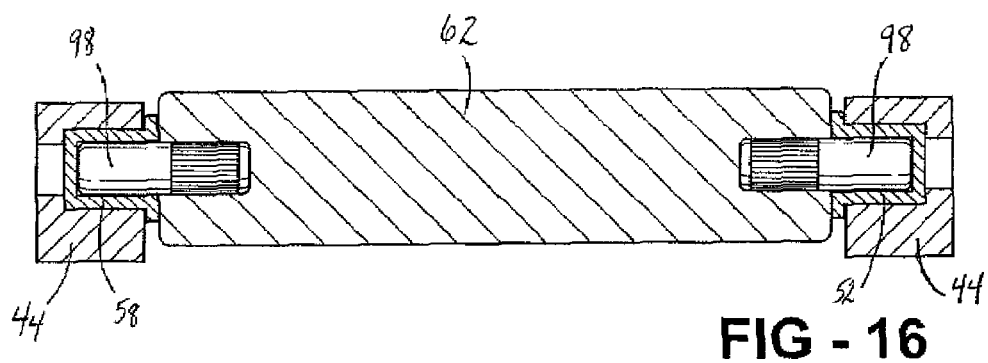
FIG. 16 is a cross-sectional side view illustrating a third pivotal connection.
Figure 17:
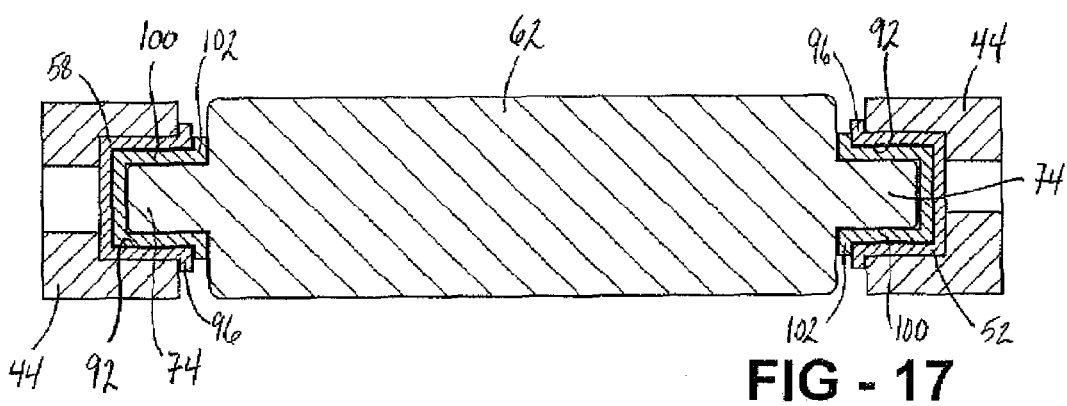
FIG. 17 is a cross-sectional side view illustrating a fourth pivotal connection.

Referring to FIGS. 14 through 17, it is contemplated that a variety of pivot shaft and bushing pivotal connections are possible for pivotally coupling the inner 62 and outer 64 arms between the rail bracket 44 and the step bracket 22 without varying from the scope of the invention. While such pivotal connections may be used for any of the pivotal connections described herein, for the sake of convenience the following description will refer only to the pivot shaft 74 extending through the upper end 70 of the first arm 62 and the opposing inner bushings 52, 58 of the rail bracket 44. In a first pivotal connection, the pivot shaft 74 extends through the inner arm 62 and each of the bushings 52, 58 include an end cap 90, as shown in FIG. 14, to prevent magnesium or other material from contaminating an inner bearing surface 92 of the respective bushing 52, 58 during the THIXOMOLDING™ process. In another pivotal connection, the pivot shaft 74 may include a step 94 for abutting a shoulder 96 of the respective bushing 52, 58 for controlling lateral movement of the inner arm 62, as shown in FIG. 15. In yet another pivotal connection, a pair of pivot pins 98 is insert molded in the inner arm 62 in place of the pivot shaft 74 and does not extend therethrough, as shown in FIG. 16. In still another pivotal connection, the pivot shaft 74 is molded as part of the inner arm 62 and may include a sleeve 100 disposed thereon for engaging the inner bearing surface 92 of the respective bushing 52, 58, as shown in FIG. 17. The sleeve 100 may also include a step 102 for abutting the shoulder 96 of the respective bushing 52, 58.

The THIXOMOLDING™ process is an injection molding process used to mold materials such as magnesium, aluminum, and zinc alloys, and is a trademark of Thixomat, Inc. of Ann Arbor, Mich. Parts formed by the THIXOMOLDING™ process have material properties generally between those of parts formed by forging and parts formed by die casting. In the THIXOMOLDING™ process, metal pellets are transferred into a heated barrel and screw system of a THIXOMOLDING™ machine. As the pellets travel through the barrel they are heated to a two-phase region, that is between the liquidus and solidus, which produces a semi-solid slurry exhibiting thixotropic properties, i.e., it retains the flow characteristics of the liquid metal but flows more smoothly, in a laminar mode. The slurry is then injected into the die or mold to form a particular part, much the same as a plastic injection molding machine is used for polymers. The THIXOMOLDING™ process produces net or near net-shape parts which reduces or eliminates finishing requirements as well as improves quality. The THIXOMOLDING™ process is also excellent for producing parts requiring extremely thin walls, which can be as thin as 0.5 mm. Other advantages include dimensional stability, low porosity and tighter part tolerances with reduced shrinkage, residual stress and component distortion.

It is contemplated that each element or component of the hinge assembly 21 (i.e., the first 24 and second 26 parts of the step bracket 22, the first 46 and second 48 portions of the rail bracket 44, and the inner 62 and outer 64 arms) could be molded in separate molds or dies. It is also contemplated that more than one element of the hinge assembly 21 could be molded in a single die at one time. For example, depending on the geometry and configuration of the hinge assembly 21, one or more of the inner 62 and outer 64 arms could be molded along with the step bracket 22 and/or the rail bracket 44 already pivotally coupled thereto.

It is further contemplated that any of the bushings 32, 34, 40, 42, 52, 54, 58, 60 and/or pivot shafts 74, 76, 86, 88 could be installed in the respective step bracket 22, rail bracket 44, or inner 62 and outer 64 arms in a secondary operation after the THIXOMOLDING™ process. It is further contemplated, that in some instances the hinge assembly 21 may be manufactured with no bushings 32, 34, 40, 42, 52, 54, 58, 60. Thus, the pivot shafts 74, 76, 86, 88 will be pivotally disposed directly in the respective first 24 and second 26 parts of the step bracket 22 and the first 46 and second 48 portions of the rail bracket 44.

In the current embodiment, the first 24 and second 26 parts of the step bracket 22, the first 46 and second 48 portions of the rail bracket 44, and the inner 62 and outer 64 arms are all made from magnesium alloy. It is, however, appreciated that any of a variety of materials could be used without varying from the scope of the invention.

It is appreciated that the invention disclosed herein will also apply to other types of automotive hinges such as single pivot hinges, six-bar linkage hinges, hood hinges, trunk hinges, door hinges, and storage compartment hinges, as well as a variety of non-automotive hinges without varying from the scope of the invention.

Figure 18:
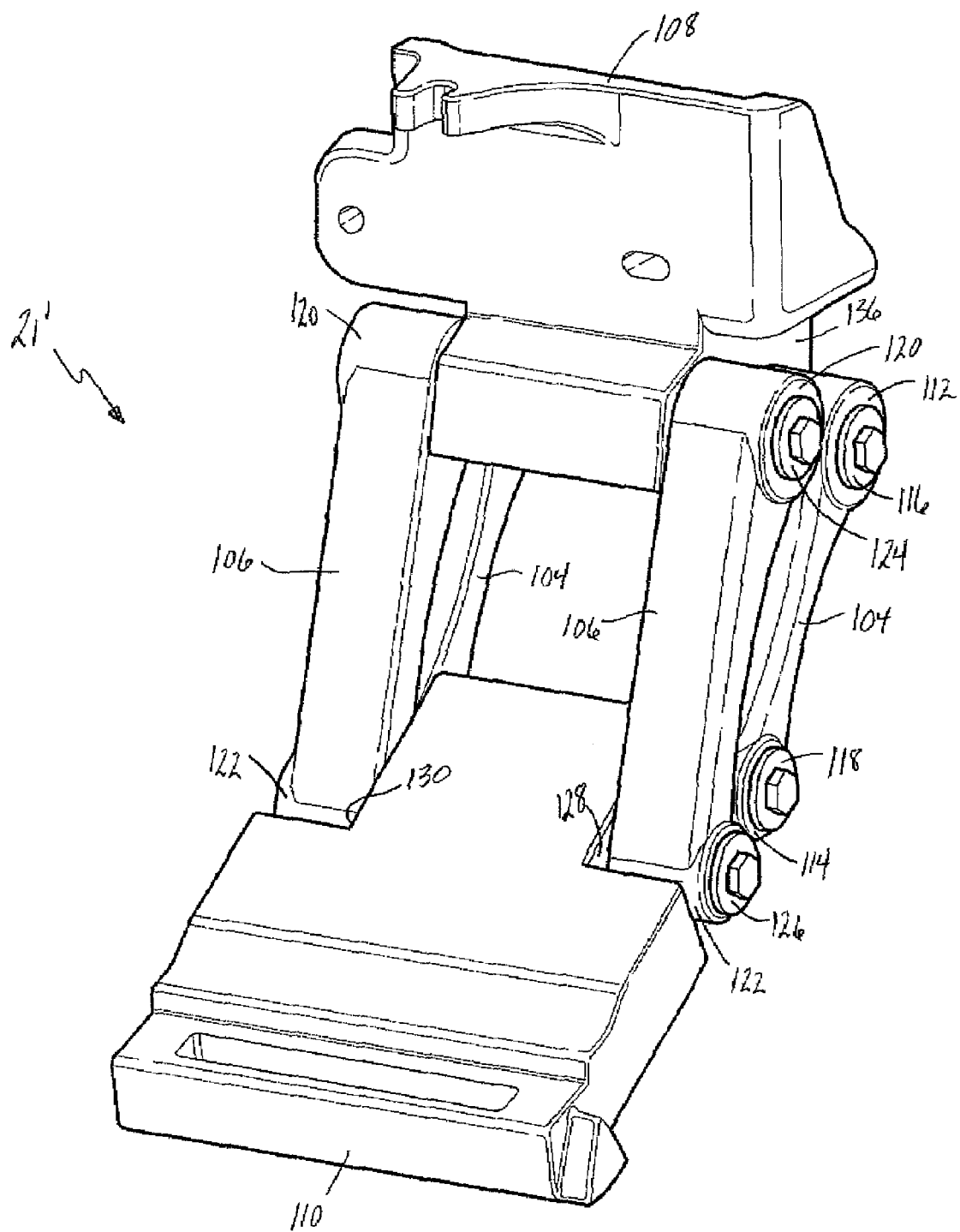
FIG. 18 is an outside perspective view of a Thixomold hinge assembly according to a second embodiment of the invention.
Figure 19:
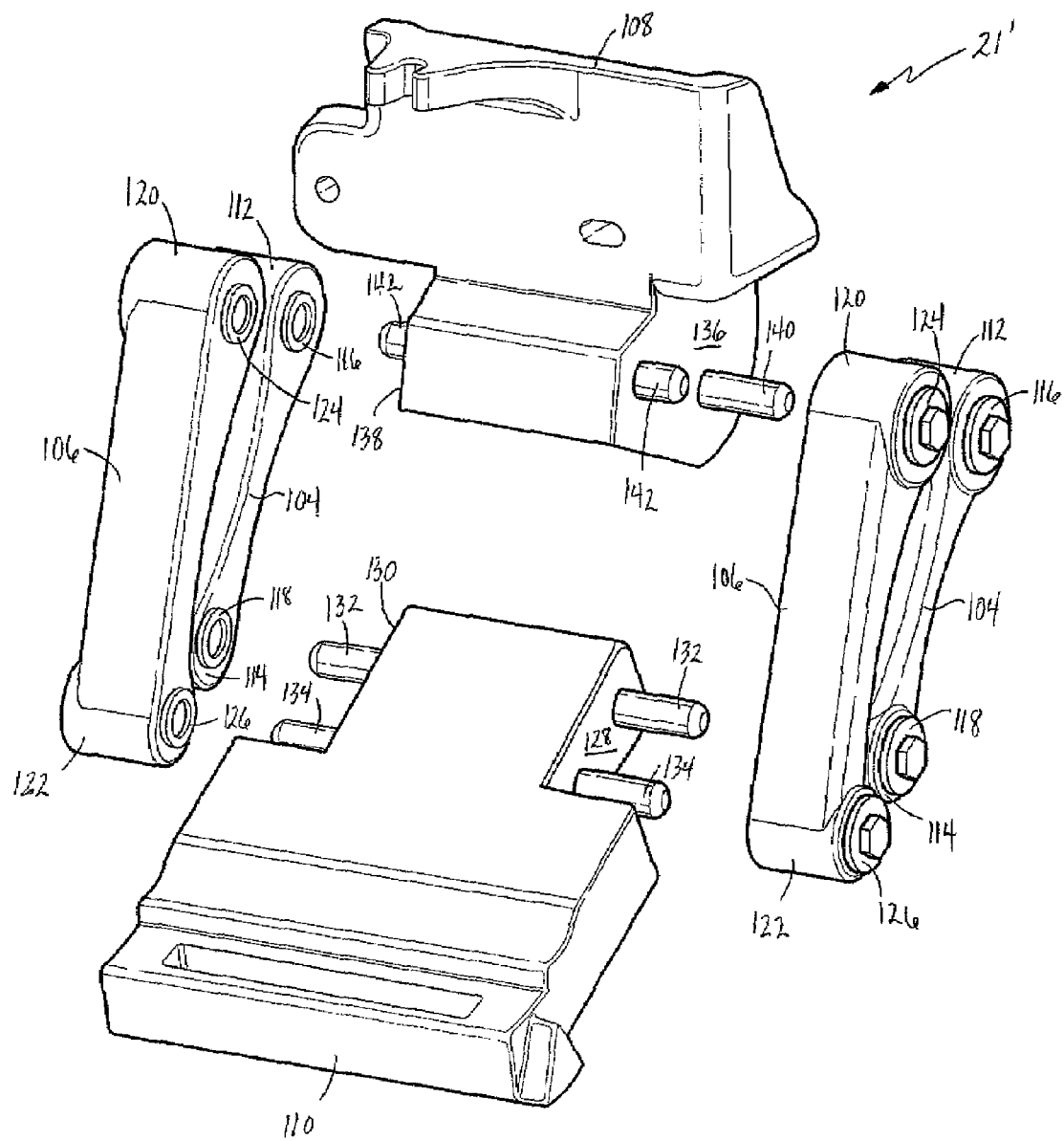
FIG. 19 is an exploded, outside perspective view of the Thixomold hinge assembly of FIG. 18.
Figure 20:
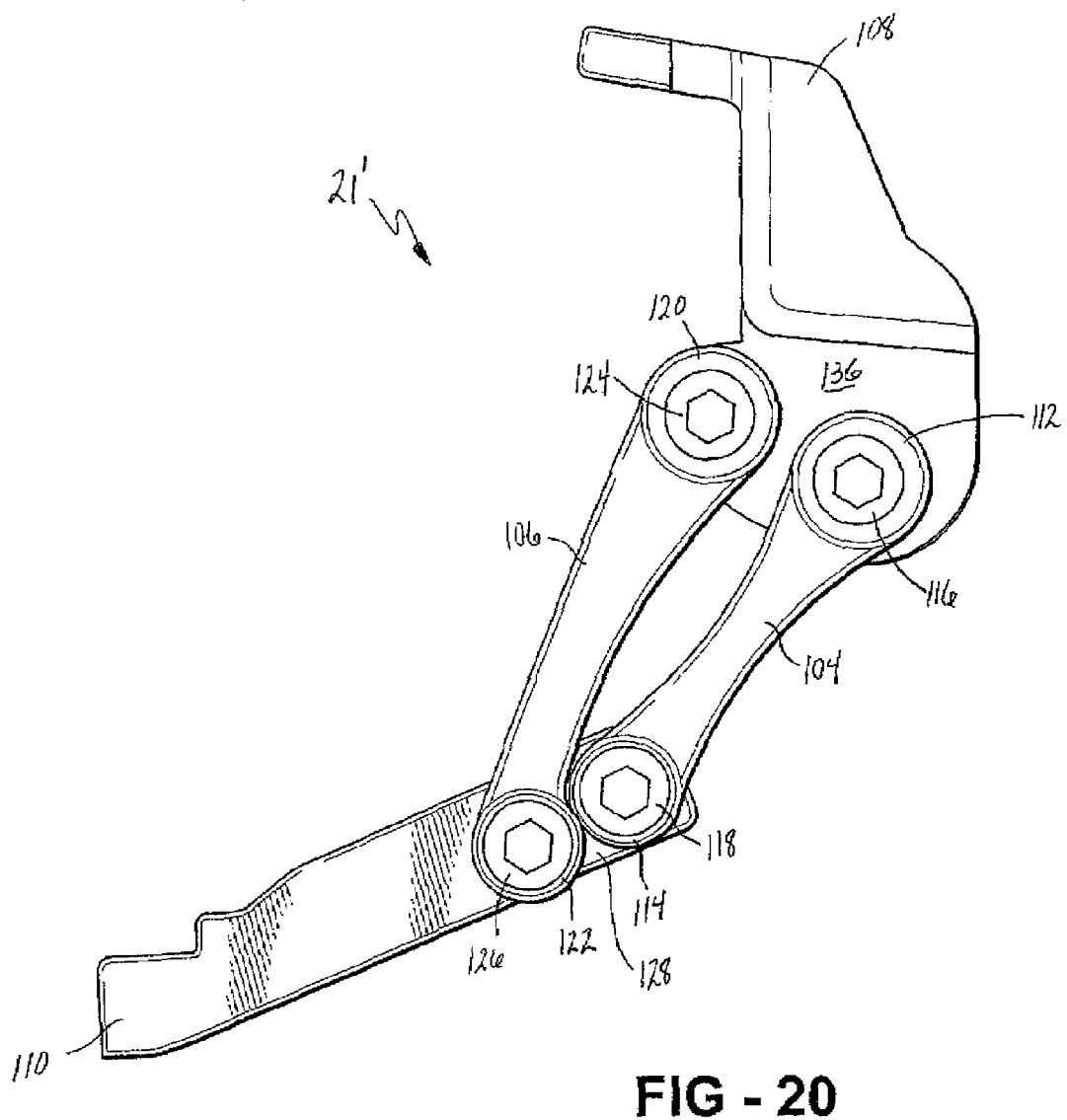
FIG. 20 is a side view of the Thixomold hinge assembly of FIG. 18.

Referring to FIGS. 18 through 20, wherein like primed reference numerals represent similar elements as those described above, in a second embodiment of the invention each hinge assembly 21' includes a pair of inner arms 104 and a pair of outer arms 106 pivotally extending between a rail bracket 108 and a step bracket 110. Each of the pair of inner arms 104 extends between an upper end 112 and a lower end 114. Each of the upper 112 and lower 114 ends includes a bushing 116, 118 disposed therein. The bushings 116, 118 are inserts placed in a die (not shown) prior to molding each of the pair of inner arms 104 using the THIXOMOLDING™ process.

Similarly, each of the pair of outer arms 106 extends between an upper end 120 and a lower end 122. Each of the upper 120 and lower 122 ends includes a bushing 124, 126 disposed therein. The bushings 124, 126 are inserts placed in the die prior to molding each of the pair of outer arms 106 using the THIXOMOLDING™ process.

The step bracket 110 is a single part and includes opposing first 128 and second 130 sides. The step bracket 110 also includes an inner pivot shaft 132 and an outer pivot shaft 134. The inner pivot shaft 132 extends laterally through the step bracket 110 and protrudes from both of the first 128 and second 130 sides. The inner pivot shaft 132 is pivotally disposed in the bushings 118 at the lower end 114 of each of the pair of inner arms 104. Similarly, the outer pivot shaft 134 extends laterally through the step bracket 110 and protrudes from both of the first 128 and second 130 sides. The outer pivot shaft 134 is pivotally disposed in the bushings 126 at the lower end 122 of each of the pair of outer arms 106. The inner 132 and outer 134 pivot shafts are inserts placed in the die prior to molding the step bracket 110 using the THIXOMOLDING™ process.

The rail bracket 108 is a single part and includes opposing first 136 and second 138 sides. The rail bracket 108 also includes an inner pivot shaft 140 and an outer pivot shaft 142. The inner pivot shaft 140 extends laterally through the rail bracket 108 and protrudes from both of the first 136 and second 138 sides. The inner pivot shaft 140 is pivotally disposed in the bushings 116 at the upper end 112 of each of the pair of inner arms 104. Similarly, the outer pivot shaft 142 extends laterally through the rail bracket 108 and protrudes from both of the first 136 and second 138 sides. The outer pivot shaft 142 is pivotally disposed in the bushings 124 at the upper end 120 of each of the pair of outer arms 106. The inner 140 and outer 142 pivot shafts are inserts placed in the die prior to molding the rail bracket 108 using the THIXOMOLDING™ process.

Pivotal movement of the pairs of inner 104 and outer 106 arms relative to the rail bracket 108 and the step bracket 110 moves the step 14' between the stowed and deployed positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A hinge assembly for moving a step between a stowed position generally adjacent a motor vehicle and a deployed position spaced apart from the motor vehicle, said hinge assembly comprising:
   a rail bracket adapted to be fixedly secured to the motor vehicle, said rail bracket including inner and outer bushings insert molded therein;
   a step bracket including inner and outer bushings insert molded therein, the step fixedly secured to said step bracket;
   an inner arm including upper and lower pivot shafts insert molded therein and protruding therefrom, wherein said upper pivot shaft is pivotally disposed in said inner bushing of said rail bracket and said lower pivot shaft is pivotally disposed in said inner bushing of said step bracket; and
   an outer arm including upper and lower pivot shafts insert molded therein and protruding therefrom, wherein said upper pivot shaft is pivotally disposed in said outer bushing of said rail bracket and said lower pivot shaft is pivotally disposed in said outer bushing of said step bracket.

2. A hinge assembly as set forth in claim 1 wherein said rail bracket and said step bracket each include a pair of spaced apart and opposing inner bushings and a pair of spaced apart and opposing outer bushings.

3. A hinge assembly as set forth in claim 2 wherein said rail bracket is a two-part bracket including a first portion fixedly secured to a second portion, wherein said first portion includes one of said pair of inner bushings and one of said pair of outer bushings and said second portion includes another of said pair of inner bushings and another of said pair of outer bushings.

4. A hinge assembly as set forth in claim 3 wherein said step bracket is a two-part bracket including a first part and a second part, wherein said first part includes one of said pair of inner bushings and one of said pair of outer bushings and said second part includes another of said pair of inner bushings and another of said pair of outer bushings.

5. A hinge assembly as set forth in claim 4 wherein said upper pivot shafts extend laterally through said inner and outer arms respectively and are pivotally disposed in said pair of inner and outer bushings of said rail bracket and said lower pivot shafts extend laterally through said inner and outer arms respectively and are pivotally disposed in said pair of inner and outer bushings of said step bracket.

* * * * *